United States Patent [19]
Dahms et al.

[11] 4,128,927
[45] Dec. 12, 1978

[54] METHOD FOR THE PRODUCTION OF A LAYER CAPACITOR

[75] Inventors: Georg Dahms, Assenhausen; Hubert Kraus, Regensburg, both of Germany

[73] Assignee: Siemens Aktiengesellschaft, Berlin & Munich, Germany

[21] Appl. No.: 825,222

[22] Filed: Aug. 17, 1977

[30] Foreign Application Priority Data

Sep. 24, 1976 [DE] Fed. Rep. of Germany ....... 2643087

[51] Int. Cl.² .............................................. H01G 4/30
[52] U.S. Cl. ..................................... 29/25.42; 29/423
[58] Field of Search ...................... 29/25.42, 423, 424; 242/56.1; 361/309

[56] References Cited
U.S. PATENT DOCUMENTS
3,670,378  6/1972  Behn .................................. 29/25.42

*Primary Examiner*—Carl E. Hall
*Attorney, Agent, or Firm*—Hill, Gross, Simpson, Van Santen, Steadman, Chiara & Simpson

[57] ABSTRACT

A simplified and less expensive method for producing layer capacitors is disclosed in which an output capacitor is produced by winding several master or parent capacitors on a drum one upon the other. The parent capacitors are separated from one another by separating films of synthetic material. These separating films are then cemented to one another and to one of the parent capacitors lying underneath, but not to the parent capacitor lying above. Protruding portions of the separating layers are ground off. The portions of the separating layers remaining serve as protecting covering layers after the separation of the parent capacitors from one another.

5 Claims, 1 Drawing Figure

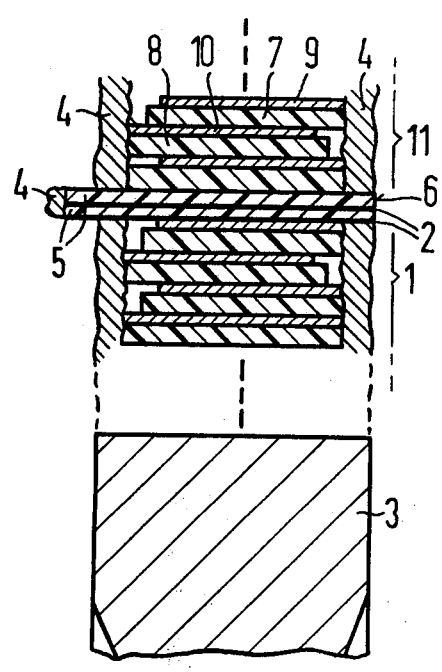

METHOD FOR THE PRODUCTION OF A LAYER CAPACITOR

BACKGROUND OF THE INVENTION

The present invention relates to a process for the production of a layer capacitor, in which one or more than one turn of dielectric layers and coatings are wound onto a drum having a large diameter. When the requisite number of layers has been reached, separating layers consisting of synthetic material and projecting beyond the dielectric layers on both sides are coiled on. Dielectric layers and coatings are again wound onto these separating layers so that a plurality of parent capacitors may be arranged one above another to form a starting capacitor. The end sides of the starting capacitor are fully covered by layers of sprayed metal and are thereby end-contacted. The starting capacitor is tempered and divided into parent capacitors along the separating layers and cut up into individual capacitors vertical to the longitudinal direction of the foil.

A process of this type is disclosed in German Pat. No. 1,764,541 corresponding to U.S. Pat. No. 3,670,378, in which the separating layers are removed and rejected where they project beyond the parent capacitors when the starting capacitor is divided up. In the mass production of such capacitors this constitutes a considerable consumption of material and a substantial labor expense.

SUMMARY OF THE INVENTION

An object of the present invention is on the one hand to exploit the advantages of the projecting separating layers for a simple division of the parent capacitors from one another including the region of the Schoop layers, and on the other hand to avoid the waste of material.

According to the invention the separating layers consist of synthetic material glued to the already wound parent capacitor, but not to the parent capacitor which is formed above the latter existing parent capacitor. The projecting parts of the separating layers are ground away following the end-contacting. A particularly clean embodiment of this process consists in that the separating layers are subjected to a glow discharge process on one side. In this case, following the tempering of the starting capacitor, the adhesion is adequate to achieve the requisite bonding. If a higher adhesive strength is required this can be achieved by coating or lacquering the separating layers with a material which does not produce a joint with the applied films until during the tempering process.

The advantage of the present invention consists in that due to the projection of the separating layers, the adhesive does not come into contact with those films which it is not intended to glue. This would in fact occur in the region of the edges of the separating layers if the latter did not project beyond the dielectric films as in the prior art. Furthermore the grinding away of the projecting part of the separating layers which possibly adheres to a lesser extent ensures that the adhesion is reliably effected up to the edge zone. This is important in this construction as the separating layers which remain as covering layers on the individual capacitor are no longer connected to the remainder of the capacitor by the layers of sprayed metal.

The parent capacitor which is wound onto the separating layers can be mechanically protected in known manner by a layer of intermediate layers which must first be wound on and which, following the division into individual capacitors, remain upon the individual capacitor as covering layers. These intermediate layers preferably do not project beyond the dielectric layers so that they are covered by the Schoop layers and thus are maintained independent of a possible additional gluing by means of the Schoop layers.

BRIEF DESCRIPTION OF THE DRAWING

The drawing is a cross-sectional view of a plurality of parent capacitors wound on a drum in accordance with the teachings of this invention.

DESCRIPTION OF THE PREFERRED EMBODIMENTS

Parent capacitors 1, 11 which are wound from metallized synthetic films 7, 8 displaced in relation to one another are produced on a drum 3. The coatings 9, 10 which consist of a plurality of turns of a metallization are contacted by the corresponding Schoop layer 4.

Between the two parent capacitors 1, 11 are arranged two turns of a separating film as separating layers 5, which are glued to one another and to the underlying parent capacitor 1 by means of lacquer layers 2 during the tempering process. The projecting part of the separating layers 5 has already been ground away on one side, so that at this point the separating layers possess a ground edge 6 which lies in the region of the outer border of the layer of sprayed metal 4. The adhesive lacquer layer 2 is unable to reach those layers of the parent capacitor 11 which lies above the separating layers 5. In this way these layers can readily be divided along the separating layers 5.

Although various minor modifications may be suggested by those versed in the art, it should be understood that I wish to embody within the scope of the patent warranted hereon, all such embodiments as reasonably and properly come within the scope of my contribution to the art.

We claim as our invention:

1. A method for the production of a layer capacitor comprising the steps of: winding sufficient turns of dielectric layers and metal coatings onto a large diameter drum to form a first parent capacitor of a desired number of layers; gluing synthetic material separating layers to the already wound first parent capacitor, said separating layers projecting beyond the dielectric layers on both sides of the wound first parent capacitor; winding additional dielectric layers and metal coatings onto the separating layers without gluing to the separating layers in order to form a second parent capacitor, in this fashion a plurality of parent capacitors being arranged one above another to form a starting capacitor; end-contacting end sides of the starting capacitor by completely covering them with layers of sprayed metal; grinding off projecting portions of the separating layers projecting beyond the dielectric layers; tempering the starting capacitor; and dividing the starting capacitor into individual parent capacitors along the separating layers and into individual capacitors at right angles to the longitudinal direction of the dielectric layers and coatings.

2. The method of claim 1 in which two separating layers are employed, a first separating layer being glued to the first parent capacitor and a second separating layer being glued to the first separating layer.

3. A method as claimed in claim 1, characterized in that the at least one separating layer is subjected to a glow-discharge process on one side.

4. A method as claimed in claim 1, characterized in that the at least one separating layer is coated with a material which does not form an adhesion with the applied films until during the tempering process.

5. A method for the production of a layer capacitor comprising the steps of: winding turns of dielectric layers and metal coatings onto a large diameter drum to form a first parent capacitor; gluing at least one synthetic material separating layer to the already wound first parent capacitor, said separating layer projecting beyond the dielectric layers of the wound first parent capacitor; winding dielectric layers onto the separating layer without gluing to the separating layer in order to form a second parent capacitor, in this fashion a plurality of parent capacitors being arranged one above the other to form a starting capacitor; end-contacting sides of the starting capacitor by completely covering them with a layer of sprayed metal; grinding off projecting portions of the separating layer projecting beyond the dielectric layers; and dividing the starting capacitor into at least first and second parent capacitors, said separating layer providing a covering layer for the first parent capacitor.

* * * * *